(12) United States Patent
Choung et al.

(10) Patent No.: US 9,795,947 B2
(45) Date of Patent: Oct. 24, 2017

(54) METHOD OF PREPARATION OF PEROVSKITE CATALYST

(71) Applicant: HYUNDAI MOTOR COMPANY, Seoul (KR)

(72) Inventors: Jin Woo Choung, Suwon-si (KR); Pyung Soon Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 5 days.

(21) Appl. No.: 14/960,107

(22) Filed: Dec. 4, 2015

(65) Prior Publication Data
US 2017/0007988 A1    Jan. 12, 2017

(30) Foreign Application Priority Data
Jul. 6, 2015   (KR) .......................... 10-2015-0096160

(51) Int. Cl.
*B01J 23/68*    (2006.01)
*B01J 23/00*    (2006.01)
(Continued)

(52) U.S. Cl.
CPC ........... *B01J 23/688* (2013.01); *B01J 23/002* (2013.01); *B01J 35/002* (2013.01); *B01J 37/08* (2013.01); *B01J 2523/00* (2013.01)

(58) Field of Classification Search
CPC .... B01J 23/002; B01J 23/688; B01J 37/0236; B01J 37/08; B01J 37/0018; B01J 2523/3706; B01J 2523/18; B01J 2523/72
(Continued)

(56) References Cited

U.S. PATENT DOCUMENTS

| | | | |
|---|---|---|---|
| 5,691,263 A * | 11/1997 | Park | B01J 23/002 502/302 |
| 5,789,339 A * | 8/1998 | Ziebarth | B01D 53/8668 502/303 |
| 2016/0104897 A1* | 4/2016 | Nitta | H01M 4/9083 429/528 |

FOREIGN PATENT DOCUMENTS

| | | | |
|---|---|---|---|
| DE | 42 17 339 | * 12/1993 | ............ B01D 53/86 |
| JP | 6-100319 A | 4/1994 | |

(Continued)

OTHER PUBLICATIONS

"Partial Substitution of lanthanum with silver in the LaMnO3 perovskite: Effect of the modification on the activity of monolithic catalysts in the reactions of methane and carbon oxide oxidation," Barbara Kucharczyk et al. Applied Catalysis A: General 335 (2008), pp. 28-36.*

(Continued)

*Primary Examiner* — Patricia L Hailey
(74) *Attorney, Agent, or Firm* — McDermott Will & Emery LLP

(57) ABSTRACT

A preparation method of perovskite catalyst, represented by the following Chemical Formula 1: $La_xAg_{(1-x)}MnO_3$ ($0.1 \leq x \leq 0.9$), includes the steps of 1) preparing a metal precursor solution including a lanthanum metal precursor, a manganese metal precursor and a silver metal precursor, 2) adding maleic or citric acid to the metal precursor solution, 3) drying the mixture separately several times with sequentially elevating the temperature in the range of 160 to 210° C., and 4) calcining the dried mixture at 600 to 900° C. for 3 hours to 7 hours.

12 Claims, 2 Drawing Sheets

(51) Int. Cl.
 *B01J 37/08* (2006.01)
 *B01J 35/00* (2006.01)
(58) Field of Classification Search
 USPC .............................. 502/303, 324, 348, 525
 See application file for complete search history.

(56) References Cited

FOREIGN PATENT DOCUMENTS

| KR | 10-0199411 | * | 6/1999 | ............. F01N 3/08 |
| KR | 10-0199411 B1 | | 6/1999 | |
| KR | 10-2013-0137868 | * | 12/2013 | ............. B01J 23/10 |
| KR | 10-2013-0137868 A | | 12/2013 | |

OTHER PUBLICATIONS

"Catalytic combustion of CH4 and CO on La1-xMxMnO3 perovskites," Kwang-Sup Song et al. Catalysis Today 47 (1999), pp. 155-160.*
"Manganese-lanthanum oxides modified with silver for the catalytic combustion of methane," Andrzej Machocki et al. Journal of Catalysis 227 (2004), pp. 282-296.*
Louise Olsson et al., "The beneficial effect of SO2 on platinum migration and NO oxidation over Pt containing monolity catalysts", Catalysis Today 1475 (2009) pp. S290-S294.
Joo-Hyoung Park et al., "Fast Colorimetric Assay for Screening NSR Catalyst", Catal. Surv. Asia (2010) 14:11-20.

* cited by examiner

METHOD OF PREPARATION OF PEROVSKITE CATALYST

TECHNICAL FIELD

The present disclosure relates to a method which can prepare perovskite catalyst stably by using a low temperature dry condition.

BACKGROUND

Diesel or lean burn gasoline vehicles of high energy efficiency emit less carbon monoxide (CO) and hydrocarbon (HC) in their exhaust gas, but the emission of nitrogen oxides (NOx) thereof shows a tendency to increase (J.-H. Park, S. J Park, I.-S Nam, Catal. Surv. Asia. 14 (2010) 11).

Among the nitrogen oxides, nitrogen monoxide (NO) causes a respiratory disease and contributes to global warming and acid rain. Accordingly, efforts to reduce the nitrogen oxides in exhaust gas emitted from cars have been ongoing, and representatively Urea-SCR and LNT catalyst technologies are known in the art. They are generally located at the back end of DOC and are designed to maximize the decrease of the nitrogen oxides in the Urea-SCR and LNT reactor through the oxidation reaction of CO, HC and NO in the exhaust gas (L. Olsson, H. Karlsson, Catal. Today, 147S (2009) S290).

Generally, it is known that a noble metal catalyst, such as platinum, has been used as the NO oxidation catalyst. However, due to the rapid increase of the price of noble metals in recent years, the preparation cost of platinum-based catalysts has increased largely. In addition, the platinum-based catalysts have a problem of catalyst activity decrease due to a deterioration phenomenon according to long-term use.

Meanwhile, through Korean Patent Publication No. 10-2013-0137868, the present inventors have recognized the fact that the perovskite catalyst having lanthanum, manganese and silver as the elements shows an excellent ability as the oxidation catalyst for nitrogen monoxide.

The preparation method of perovskite catalyst disclosed in said Patent Publication is a citric acid method, and the preparation processes are as follows. First, a metal precursor solution was prepared by dissolving $La(NO_3)_3 \cdot 6H_2O$ 10.5597 g, $Mn(NO_3)_2 \cdot 6H_2O$ 14.0000 g and $AgNO_3$ 4.1426 g in a distilled water. An excess of citric acid 10 wt % more than the amount corresponding to the mole of the metal precursors was added to the solution and the solution was stirred for 1 hour. Subsequently, the solution was heated to 80° C. and the distilled water was slowly evaporated by maintaining the temperature for 8 hours with continuously stirring. The perovskite catalyst of gel phase from which over certain amount of the distilled water was eliminated was completely dried overnight in a 110° C. oven. Finally, perovskite catalyst of $La_{0.5}Ag_{0.5}MnO_3$ was synthesized through pre-combustion (250° C.) and calcination (700° C.) under atmospheric conditions for 5 hours.

However, in the preparation method of perovskite disclosed in said Patent Publication, the collect rate of the residue in the crucible for the catalyst was less than 10% because the raw materials were exploded and scattered during the preparation process. Therefore, the preparation method has disadvantages in that it must be carried out in a sealed place, the collect rate of the catalyst is low, and the product is easily contaminated because most of the prepared catalyst exists on the floor.

For this reason, the present inventors have conducted a study on a stable preparation method of perovskite catalyst that is very effective as an oxidation catalyst for nitrogen oxides, particularly, nitrogen monoxide, and completed the present disclosure by recognizing the fact that it is possible to resolve the problem by applying a low temperature dry condition to the method as disclosed below.

SUMMARY OF THE DISCLOSURE

It is an aspect of the present disclosure to provide a stable preparation method of perovskite catalyst showing excellent abilities as an oxidation catalyst for nitrogen oxides, particularly nitrogen monoxide.

DETAILED DESCRIPTION

Figure 1:
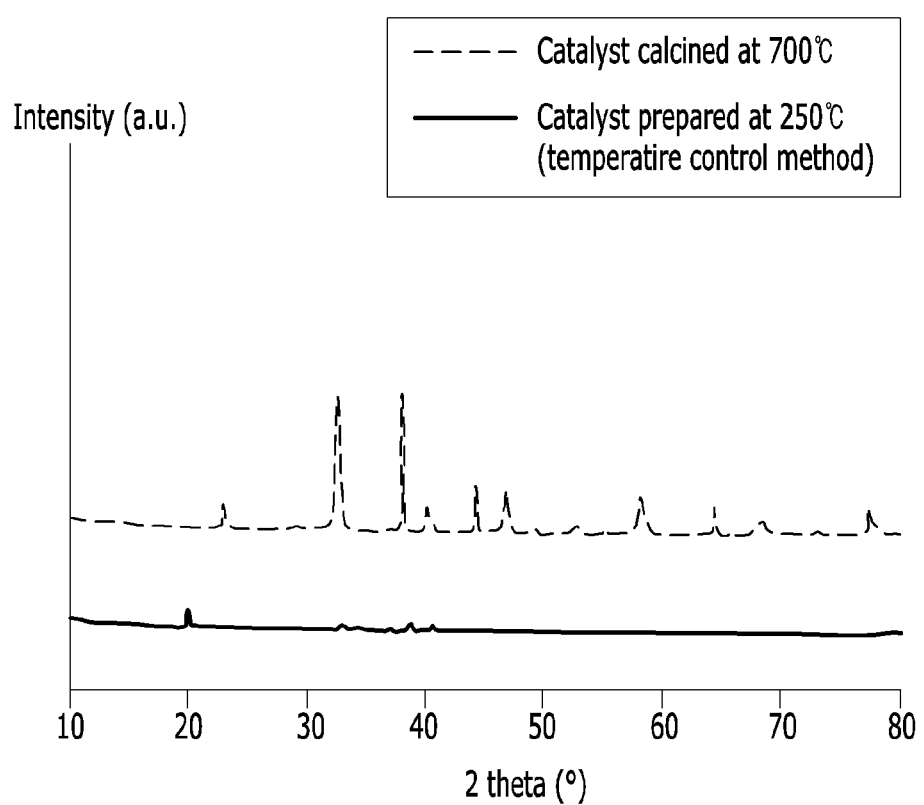
FIG. 1 shows the XRD peaks of the catalyst that was prepared by the temperature control method and the catalyst that was subsequently calcined at 700° C. according to Example of the present disclosure. Here, the XRD peaks of perovskite are shown after the calcination and it means that the perovskite catalyst was formed after the calcination at 700° C. Whereas, the catalyst prepared by the temperature control method of elevating the temperature to 250° C. does not show the XRD peaks of perovskite and it means that the perovskite was not formed.

To achieve the object, the present disclosure provides a preparation method of perovskite catalyst represented by the following Chemical Formula 1, including the steps of:

1) preparing a metal precursor solution including a lanthanum metal precursor, a manganese metal precursor and a silver metal precursor;

2) adding citric acid or maleic acid to the metal precursor solution;

3) drying the mixture separately several times while sequentially elevating the temperature in the range of 160 to 210° C.; and 4) calcining the dried mixture at 600 to 900° C. for 3 to 7 hours.

$$La_xAg_{(1-x)}MnO_3 \ (0.1 \leq x \leq 0.9). \quad \text{[Chemical Formula 1]}$$

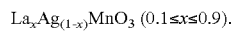

The term 'perovskite catalyst' used in the present disclosure is essentially a material having the chemical structure of $ABO_3$, here, A is a cation located at the center of the crystal lattice that is surrounded by 12 lattice oxygens, and B is a cation located at the center of the crystal lattice that is surrounded by 6 lattice oxygens. The characteristics of the perovskite catalyst vary according to the cations corresponding to A and B in the chemical formula.

The perovskite catalyst of the present disclosure includes La, Ag and Mn as the main elements as shown in Chemical Formula 1, and particularly it is a catalyst for converting nitrogen monoxide (NO) discharged in car exhaust gas into nitrogen dioxide. At this time, silver (Ag) has an advantage in that it is superior in NO oxidation performance and hydrothermal stability, and the use of expensive noble metals, which is a problem of existing Pt-based catalyst used in the oxidation reaction of NO in the exhaust gas from diesel and lean burn-gasoline cars, can be avoided.

With regard to the preparation of the perovskite catalyst, the citric acid method, Pechini method, high temperature aging method, polymer complex method, freeze drying method, and so on are known, and generally the citric acid method is generally used. The citric acid method is a method of obtaining the perovskite catalyst by using citric aid to form a noncrystalline metal complex of gel phase, and drying and calcining the same (Appl. Catal. B: Environ., 24 (2000) 193-205). However, the method is poor in the collect rate and very dangerous because citric acid causes an explosion and scattering of raw materials in the preparation process.

Therefore, the present disclosure is characterized in that the low temperature drying process is carried out before the calcination as in step 3) to resolve the problem.

Hereinafter, the present disclosure is explained step by step in more detail.

Step 1: Preparing a Metal Precursor Solution including a Lanthanum Metal Precursor, a Manganese Metal Precursor and a Silver Metal Precursor This is the step of preparing a metal precursor solution of lanthanum (La), manganese (Mn) and silver (Ag) which are the main components of the perovskite catalyst to be prepared in the present disclosure.

Preferably, the lanthanum metal precursor may be $La(NO_3)_3 \cdot 6H_2O$. And, preferably, the manganese metal precursor may be $Mn(NO_3)_2 \cdot 6H_2O$. And, preferably, the silver metal precursor may be $AgNO_3$.

Furthermore, it is preferable to determine the mole numbers of the 3 kinds of metal precursors properly by considering the x value in Chemical Formula 1. For example, when the x value in Chemical Formula 1 is 0.5, the mole ratio of the lanthanum metal precursor, the silver metal precursor, and the manganese metal precursor may be 1:1:2.

It is preferable that the solvent of the metal precursor solution is a distilled water. The amount of the solvent is not limited particularly if it can dissolve all of the metal precursors. The metal precursor solution may be prepared by the method of adding the 3 kinds of metal precursors to the solvent and stirring the same, and the preparation is preferably carried out at room temperature.

Step 2: Adding Citric Acid or Maleic Acid to the Metal Precursor Solution

This is the step of adding citric acid or maleic acid to the metal precursor solution prepared in Step 1 for preparing a noncrystalline metal complex of gel phase in a later drying step.

Preferably, the amount of citric acid or maleic acid added may be 0.2 to 2.0 moles, more preferably 0.8 to 1.4 moles, per the total mole of lanthanum, manganese and silver in the metal precursor solution. For example, when the total mole of the 3 kinds of metal precursors used for preparing the metal precursor solution is 1 mole, the amount of citric acid or maleic acid added may be 0.4 to 0.7 moles, preferably.

The addition of citric acid or maleic acid is preferably carried out at room temperature, and it is preferable to stir the mixture during the addition or after the addition.

In addition, the step of stirring the solution at 70 to 90° C. for 6 to 10 hours and drying the same at 100 to 120° C. for 8 to 14 hours may be further included between Step 2 and Step 3 disclosed below. Through this, the solvent of the metal precursor solution may be evaporated and the noncrystalline metal complex of gel phase may be prepared.

Step 3: Separate Drying

This is the step of drying the noncrystalline metal complex of gel phase at low temperature before the calcination step, disclosed later. As the metal complex is dried at low temperature for a long time, there are advantages in that not only the explosion that could happen in the process of elevating the temperature can be prevented and a collection rate may increase, but also that contamination may be minimized.

The separate drying step may be designed so that the temperature of each drying step increases slowly. Preferably Step 3 may be carried out by the following steps of 3-1) to 3-5):

3-1) heating the mixture to 163 to 167° C. and carrying out primary dry for 2 to 6 hours;

3-2) heating the primary dried mixture to 168 to 172° C. and carrying out secondary dry for 2 to 6 hours;

3-3) heating the secondary dried mixture to 170 to 174° C. and carrying out tertiary dry for 2 to 6 hours;

3-4) heating the tertiary dried mixture to 173 to 177° C. and carrying out quaternary dry for 2 to 6 hours; and 3-5) heating the quaternary dried mixture to 198 to 202° C. and carrying out quinary dry for 1 to 3 hours.

Furthermore, the heating rate between each drying step is preferably 1° C./min to 10° C./min.

Furthermore, said primary dry to quaternary dry steps correspond to relatively lower temperature dry than quinary dry step, and their dry time may be 2 to 6 hours. And, said quinary dry step corresponds to relatively higher temperature dry and the dry time may be relatively short, 1 to 3 hours.

Furthermore, the present disclosure can further comprise the step of finally drying the mixture dried in Step 3. Specifically, such a finally drying is preferably carried out at relatively high temperature of 248 to 252° C. for 1 hour to 3 hours.

Step 4: Calcining the Dried Mixture at 600 to 900° C. for 3 to 7 Hours

This is the step of calcining the mixture dried in Step 3, and the elements form a crystalline phase through the calcination and the perovskite catalyst according to the present disclosure is prepared in this step.

The calcination is preferably carried in an atmospheric circumstance.

Perovskite Catalyst

The perovskite catalyst prepared according to the present disclosure has the structure represented by Chemical Formula 1, and it may be used as the oxidation catalyst for nitrogen monoxide.

Particularly, since the prepared perovskite catalyst includes silver (Ag) which is superior in nitrogen monoxide oxidation performance and hydrothermal stability, it can be used as the main component of the post-treatment system for reducing NOx in an exhaust gas of lean burn gasoline and diesel engines, and it is possible to accelerate the commercialization of lean burn gasoline and diesel engines and to reduce manufacturing cost because of the exclusion of noble metals.

And, preferably, the x in Chemical Formula 1 is 0.3 to 0.7.

Furthermore, the perovskite catalyst of the present disclosure is a core technology of the futuristic car exhaust post-treatment system, and can be applied to low emission vehicles or eco-friendly vehicles satisfying the environment regulations of WTO system.

The preparation method of the perovskite catalyst according to the present disclosure is characterized in that the perovskite catalyst can be stably prepared by using a low temperature dry condition.

Hereinafter, preferable examples are presented for understanding the present disclosure. However, the following examples are only for understanding the present disclosure more easily and the present disclosure is not limited to or by them.

Example

A metal precursor solution was prepared by dissolving La(NO$_3$)$_3$.6H$_2$O 10.5597 g, Mn(NO$_3$)$_2$.6H$_2$O 14.0000 g, and AgNO$_3$ 4.1426 g, the metal precursors, in a distilled water. After adding 11 g of citric acid to the metal precursor solution and stirring the same, the solution was heated to 80° C. and the distilled water was slowly evaporated by maintaining the temperature for 8 hours with continuously stirring. The perovskite catalyst of gel phase from which over a certain amount of the distilled water was eliminated was dried for 12 hours in a 110° C. oven.

1 g of the dried mixture was taken, and, sequentially, heated to 165° C. and dried for 4 hours while maintaining the temperature, heated to 170° C. and dried for 4 hours while maintaining the temperature, heated to 172° C. and dried for 4 hours while maintaining the temperature, and heated to 175° C. and dried for 4 hours while maintaining the temperature. And then, the dried mixture was heated to 200° C. and dried for 2 hours while maintaining the temperature, and heated to 250° C. and dried for 1 hour while maintaining the temperature. At this time, the heating rate was 10° C./min. And then, the perovskite catalyst was obtained by calcining the dried mixture in an atmospheric circumstance of 700° C. for 5 hours. And, there was no explosion throughout the whole process.

Comparative Example

A metal precursor solution was prepared by dissolving La(NO$_3$)$_3$.6H$_2$O 10.5597 g, Mn(NO$_3$)$_2$.6H$_2$O 14.0000 g, and AgNO$_3$ 4.1426 g, the metal precursors, in a distilled water. After adding 11 g of citric acid to the metal precursor solution and stirring the same, the solution was heated to 80° C. and the distilled water was slowly evaporated by maintaining the temperature for 8 hours with continuously stirring. The perovskite catalyst of gel phase from which over certain amount of the distilled water was eliminated was dried for 12 hours in a 110° C. oven.

The perovskite catalyst of gel phase from which over a certain amount of the distilled water was eliminated was completely dried for 12 hours in a 110° C. oven. The perovskite catalyst of La$_{0.5}$Ag$_{0.5}$MnO$_3$ was finally synthesized by heating the same to the pre-combustion temperature of 250° C. with the heating rate of 10° C./min and further drying for 2 hours in an atmospheric circumstance.

Experimental Example

Figure 2:
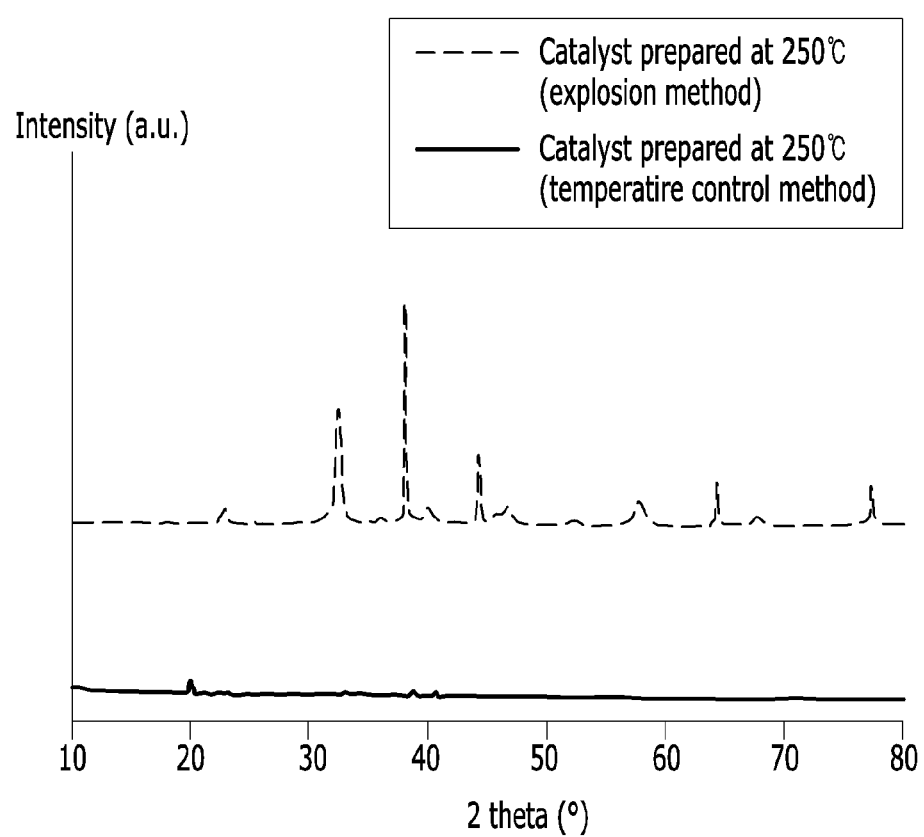
FIG. 2 is the XRD analysis results of the catalyst that was prepared with controlling the temperature in the process of elevating the temperature to 250° C. in Example of the present disclosure and the catalyst that was prepared without controlling the temperature in the process of elevating the temperature in Comparative Example. It shows that the perovskite catalyst was not prepared when the temperature was controlled, in comparison with the case without controlling the temperature.

The perovskite catalysts prepared in the Example and the Comparative Example were analyzed by XRD, and the results are illustrated in FIGS. 1 and 2.

FIG. 1 shows the XRD peaks of the catalyst that was prepared by the temperature control method and the catalyst that was subsequently calcined at 700° C. in the Example. Here, the XRD peaks of perovskite are shown after the calcination, meaning that the perovskite catalyst was formed after the calcination at 700° C. The catalyst prepared by the temperature control method of elevating the temperature to 250° C. does not show the XRD peaks of perovskite, and it means that perovskite was not formed.

FIG. 2 is the XRD analysis results of the catalyst that was prepared with controlling the temperature in the process of elevating the temperature to 250° C. in the Example and the catalyst that was prepared without controlling the temperature in the process of elevating the temperature in the Comparative Example. It shows that the perovskite catalyst was not prepared when the temperature was controlled, in comparison with the case without controlling the temperature.

As disclosed above, the temperature control method for preparing the perovskite catalyst according to the present disclosure can prepare the perovskite catalyst without involving an explosion in the preparation process.

The invention claimed is:

1. A preparation method of perovskite catalyst, represented by the following Chemical Formula 1: La$_x$Ag$_{(1-x)}$MnO$_3$ (0.1≤x≤0.9), including the steps of:
   1) preparing a metal precursor solution including a lanthanum metal precursor, a manganese metal precursor and a silver metal precursor;
   2) adding citric acid to the metal precursor solution;
   3) drying the mixture separately several times while sequentially elevating the temperature in the range of 160 to 210° C.; and
   4) calcining the dried mixture at 600 to 900° C. for 3 hours to 7 hours.

2. The preparation method according to claim 1, wherein the lanthanum metal precursor is La(NO$_3$)$_3$.6H$_2$O.

3. The preparation method according to claim 1, wherein the manganese metal precursor is Mn(NO$_3$)$_2$.6H$_2$O.

4. The preparation method according to claim 1, wherein the silver metal precursor is AgNO$_3$.

5. The preparation method according to claim 1, wherein a solvent of the metal precursor solution is distilled water.

6. The preparation method according to claim 1, wherein the amount of citric acid added is 0.2 to 2.0 moles per the total mole of lanthanum, manganese and silver in the metal precursor solution.

7. The preparation method according to claim 1, further including the step of stirring the solution at 70 to 90° C. for 6 to 10 hours and drying the same at 100 to 120° C. for 8 to 14 hours, between step 2) and step 3).

8. The preparation method according to claim 1, wherein step 3) is carried out by the steps of:
   3-1) heating the mixture to 163 to 167° C. and carrying out a primary dry for 2 to 6 hours;
   3-2) heating the primary dried mixture to 168 to 172° C. and carrying out a secondary dry for 2 to 6 hours;
   3-3) heating the secondary dried mixture to 170 to 174° C. and carrying out a tertiary dry for 2 to 6 hours;
   3-4) heating the tertiary dried mixture to 173 to 177° C. and carrying out a quaternary dry for 2 to 6 hours; and
   3-5) heating the quaternary dried mixture to 198 to 202° C. and carrying out a quinary dry for 1 to 3 hours.

9. The preparation method according to claim 8, wherein the heating rate is 1° C./min to 10° C./min.

10. The preparation method according to claim 1, wherein x is 0.3 to 0.7.

11. A preparation method of perovskite catalyst, represented by the following Chemical Formula 1: La$_x$Ag$_{(1-x)}$MnO$_3$ (0.1≤x≤0.9), including the steps of:

1) preparing a metal precursor solution including a lanthanum metal precursor, a manganese metal precursor and a silver metal precursor;
2) adding maleic acid to the metal precursor solution;
3) drying the mixture separately several times while sequentially elevating the temperature in the range of 160 to 210° C.; and
4) calcining the dried mixture at 600 to 900° C. for 3 hours to 7 hours.

12. The preparation method according to claim 11, wherein the amount of maleic acid added is 0.2 to 2.0 moles per the total mole of lanthanum, manganese and silver in the metal precursor solution.

\* \* \* \* \*